US012323301B2

(12) United States Patent
Browne et al.

(10) Patent No.: US 12,323,301 B2
(45) Date of Patent: *Jun. 3, 2025

(54) INTERWORKING OF LEGACY APPLIANCES IN VIRTUALIZED NETWORKS

(71) Applicant: Intel Corporation, Santa Clara, CA (US)

(72) Inventors: John J. Browne, Limerick (IE); Timothy Verrall, Pleasant Hill, CA (US); Maryam Tahhan, Limerick City (IE); Michael J. McGrath, Cavan (IE); Sean Harte, Limerick (IE); Kevin Devey, Cork (IE); Jonathan Kenny, Tipperary (IE); Christopher MacNamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,246

(22) Filed: Sep. 19, 2023

(65) Prior Publication Data

US 2024/0015067 A1    Jan. 11, 2024

Related U.S. Application Data

(63) Continuation of application No. 17/945,455, filed on Sep. 15, 2022, now Pat. No. 11,818,008, which is a
(Continued)

(51) Int. Cl.
*H04L 41/0895* (2022.01)
*H04L 41/08* (2022.01)
(Continued)

(52) U.S. Cl.
CPC ...... *H04L 41/0895* (2022.05); *H04L 41/0806* (2013.01); *H04L 41/0823* (2013.01);
(Continued)

(58) Field of Classification Search
CPC ..... H04L 67/10; H04L 63/1433; H04L 67/55; H04L 43/0817; H04L 45/586;
(Continued)

(56) References Cited

U.S. PATENT DOCUMENTS 5,909,686 A    6/1999 Muller et al.
6,357,003 B1    3/2002 Zarrin et al.
(Continued)

FOREIGN PATENT DOCUMENTS

AU    2014315117    3/2016
CN    102549977    7/2012
(Continued)

OTHER PUBLICATIONS

"Mellanox Sets New DPDK Performance Record With ConnectX-5," HPC Wire, Feb. 27, 2017, 3 pgs.
(Continued)

*Primary Examiner* — Djenane M Bayard
(74) *Attorney, Agent, or Firm* — Essential Patents Group, LLP; Christopher K. Gagne

(57) ABSTRACT

A computing apparatus, including: a hardware platform; and an interworking broker function (IBF) hosted on the hardware platform, the IBF including a translation driver (TD) associated with a legacy network appliance lacking native interoperability with an orchestrator, the IBF configured to: receive from the orchestrator a network function provisioning or configuration command for the legacy network appliance; operate the TD to translate the command to a format consumable by the legacy network appliance; and forward the command to the legacy network appliance.

16 Claims, 8 Drawing Sheets

Related U.S. Application Data continuation of application No. 15/716,890, filed on Sep. 27, 2017, now Pat. No. 11,469,953.

(51) Int. Cl.
| | |
|---|---|
| *H04L 41/0806* | (2022.01) |
| *H04L 41/0823* | (2022.01) |
| *H04L 41/0873* | (2022.01) |
| *H04L 41/0896* | (2022.01) |
| *H04L 41/0897* | (2022.01) |
| *H04L 41/50* | (2022.01) |

(52) U.S. Cl.
CPC ...... *H04L 41/0873* (2013.01); *H04L 41/0897* (2022.05); *H04L 41/0886* (2013.01); *H04L 41/0896* (2013.01); *H04L 41/50* (2013.01)

(58) Field of Classification Search
CPC ..... H04L 41/0869; H04L 45/02; H04L 65/61; H04L 65/80; H04L 67/02; H04L 67/1095; H04L 67/1097; H04L 41/40; H04L 65/612; H04L 65/762; H04L 41/0895; H04L 45/04; H04L 45/16; H04L 41/0894; H04L 41/5019; H04L 43/20; H04L 65/1069; H04L 41/0897; H04L 41/0896; H04L 41/0886; H04L 41/0893; H04L 41/122; H04L 41/16; H04L 41/5051; H04L 9/0897; H04L 41/0654; H04L 41/0806; H04L 41/0823; H04L 41/0866; H04L 41/0873; H04L 41/50; H04L 41/046; H04L 41/0816; H04L 41/12; H04L 41/145; H04L 41/22; H04L 41/5003; H04L 41/5009; H04L 43/045; H04L 43/0876; H04L 67/06; H04L 47/762; H04L 47/781; H04L 47/801; H04L 47/822

See application file for complete search history.

(56) References Cited

U.S. PATENT DOCUMENTS

| | | | |
|---|---|---|---|
| 6,526,442 B1 | 2/2003 | Stupek, Jr. et al. | |
| 8,027,354 B1 | 9/2011 | Portolani et al. | |
| 8,099,487 B1 | 1/2012 | Smirnov et al. | |
| 8,185,894 B1 | 5/2012 | Watson et al. | |
| 8,296,759 B1 | 10/2012 | Hutchins et al. | |
| 8,619,771 B2 | 12/2013 | Lambeth et al. | |
| 8,918,631 B1 | 12/2014 | Kumar et al. | |
| 9,031,081 B2 | 5/2015 | Elzur et al. | |
| 9,577,879 B1 | 2/2017 | Kumar et al. | |
| 9,594,598 B1 | 3/2017 | Brouwer et al. | |
| 9,983,832 B1 | 5/2018 | Mayatskikh | |
| 10,027,605 B2 | 7/2018 | Agarwal et al. | |
| 10,169,068 B2 | 1/2019 | Brouwer et al. | |
| 10,447,728 B1 | 10/2019 | Steinberg | |
| 10,613,888 B1 | 4/2020 | Mentz et al. | |
| 10,630,660 B1 | 4/2020 | Kumar et al. | |
| 10,642,753 B1 | 5/2020 | Steinberg | |
| 10,652,327 B2 | 5/2020 | Nidugala et al. | |
| 10,721,273 B2 | 7/2020 | Rubakha | |
| 10,909,066 B2 | 2/2021 | Zhu et al. | |
| 10,999,219 B1 | 5/2021 | Athreyapurapu et al. | |
| 11,075,948 B2 | 7/2021 | Gourlay et al. | |
| 11,088,988 B2 | 8/2021 | Chuu | |
| 2005/0108518 A1 | 5/2005 | Pandya | |
| 2005/0182853 A1 | 8/2005 | Lewites et al. | |
| 2006/0136570 A1 | 6/2006 | Pandya | |
| 2006/0165103 A1 | 7/2006 | Trudeau et al. | |
| 2006/0171323 A1 | 8/2006 | Qian et al. | |
| 2007/0011444 A1 | 1/2007 | Grobman et al. | |
| 2007/0050767 A1 | 3/2007 | Grobman et al. | |
| 2008/0201468 A1 | 8/2008 | Titus | |
| 2008/0244028 A1 | 10/2008 | Le et al. | |
| 2009/0119087 A1 | 5/2009 | Ang et al. | |
| 2009/0216992 A1 | 8/2009 | Greiner et al. | |
| 2010/0014526 A1 | 1/2010 | Chavan et al. | |
| 2010/0211946 A1 | 8/2010 | Elzur | |
| 2010/0223397 A1 | 9/2010 | Elzur | |
| 2010/0269109 A1 | 10/2010 | Cartales | |
| 2011/0022812 A1 | 1/2011 | van der Linden et al. | |
| 2011/0023030 A1 | 1/2011 | Lim et al. | |
| 2011/0082962 A1 | 4/2011 | Horovitz et al. | |
| 2011/0090915 A1 | 4/2011 | Droux et al. | |
| 2011/0265116 A1 | 10/2011 | Stern et al. | |
| 2011/0320632 A1 | 12/2011 | Karino | |
| 2012/0144154 A1 | 6/2012 | Heller et al. | |
| 2012/0167082 A1 | 6/2012 | Kumar et al. | |
| 2012/0246638 A1 | 9/2012 | He et al. | |
| 2012/0275328 A1 | 11/2012 | Iwata et al. | |
| 2012/0307838 A1 | 12/2012 | Manula et al. | |
| 2012/0311208 A1 | 12/2012 | Manula et al. | |
| 2012/0324442 A1 | 12/2012 | Barde | |
| 2013/0031568 A1 | 1/2013 | Tamir et al. | |
| 2013/0042123 A1 | 2/2013 | Smith et al. | |
| 2013/0064133 A1 | 3/2013 | Ritz et al. | |
| 2013/0151710 A1* | 6/2013 | D'souza | H04L 47/20 709/226 |
| 2013/0219030 A1 | 8/2013 | Szabo et al. | |
| 2013/0254424 A1 | 9/2013 | Guay et al. | |
| 2013/0283266 A1 | 10/2013 | Baset et al. | |
| 2013/0343399 A1 | 12/2013 | Kandula et al. | |
| 2014/0059160 A1 | 2/2014 | Chernoff et al. | |
| 2014/0068137 A1 | 3/2014 | Kegel et al. | |
| 2014/0164670 A1 | 6/2014 | Voorhees et al. | |
| 2014/0244965 A1 | 8/2014 | Manula et al. | |
| 2014/0259012 A1 | 9/2014 | Nandlall et al. | |
| 2014/0310704 A1 | 10/2014 | Cantu | |
| 2014/0317261 A1 | 10/2014 | Shatzkamer et al. | |
| 2014/0334492 A1 | 11/2014 | Mack-Crane | |
| 2014/0372723 A1 | 12/2014 | Bobroff et al. | |
| 2015/0128245 A1 | 5/2015 | Brown et al. | |
| 2015/0143367 A1 | 5/2015 | Jia et al. | |
| 2015/0186173 A1 | 7/2015 | Wang et al. | |
| 2015/0215384 A1 | 7/2015 | Bannai et al. | |
| 2015/0301945 A1 | 10/2015 | Panesar et al. | |
| 2015/0317169 A1 | 11/2015 | Sinha et al. | |
| 2015/0370590 A1 | 12/2015 | Tuch et al. | |
| 2016/0085568 A1 | 3/2016 | Dupre et al. | |
| 2016/0147556 A1 | 5/2016 | Hu et al. | |
| 2016/0149771 A1 | 5/2016 | Prasad et al. | |
| 2016/0164832 A1 | 6/2016 | Bellagamba et al. | |
| 2016/0165103 A1 | 6/2016 | Topliss | |
| 2016/0210242 A1 | 7/2016 | Fontenot et al. | |
| 2016/0254956 A1 | 9/2016 | Xu et al. | |
| 2016/0329965 A1 | 11/2016 | Cook et al. | |
| 2016/0350151 A1 | 12/2016 | Zou et al. | |
| 2016/0380831 A1 | 12/2016 | Shevenell et al. | |
| 2016/0380909 A1 | 12/2016 | Antony et al. | |
| 2017/0031719 A1 | 2/2017 | Clark et al. | |
| 2017/0034050 A1 | 2/2017 | Sunavala et al. | |
| 2017/0046185 A1 | 2/2017 | Tsirkin | |
| 2017/0063628 A1 | 3/2017 | Rasanen | |
| 2017/0063652 A1 | 3/2017 | Wu et al. | |
| 2017/0063678 A1 | 3/2017 | Rasanen et al. | |
| 2017/0099182 A1 | 4/2017 | Debolle et al. | |
| 2017/0104609 A1* | 4/2017 | McNamee | H04W 4/24 |
| 2017/0116021 A1 | 4/2017 | Miller | |
| 2017/0177396 A1 | 6/2017 | Palermo et al. | |
| 2017/0180273 A1 | 6/2017 | Daly et al. | |
| 2017/0192921 A1 | 7/2017 | Wang et al. | |
| 2017/0257424 A1 | 9/2017 | Neogi et al. | |
| 2017/0272274 A1 | 9/2017 | Onno et al. | |
| 2017/0279672 A1 | 9/2017 | Krishnan et al. | |
| 2017/0337071 A1 | 11/2017 | Scott et al. | |
| 2017/0353433 A1 | 12/2017 | Antony et al. | |
| 2017/0371698 A1 | 12/2017 | Paolino et al. | |
| 2018/0034769 A1 | 2/2018 | Modi et al. | |
| 2018/0041905 A1 | 2/2018 | Ashrafi | |
| 2018/0059974 A1 | 3/2018 | Tsirkin | |
| 2018/0109471 A1 | 4/2018 | Chang et al. | |
| 2018/0115585 A1 | 4/2018 | Rubakha | |

(56) References Cited

U.S. PATENT DOCUMENTS

| | | | |
|---|---|---|---|
| 2018/0123963 | A1 | 5/2018 | Thubert et al. |
| 2018/0173547 | A1 | 6/2018 | Stokes et al. |
| 2018/0191607 | A1 | 7/2018 | Kanakarajan |
| 2018/0205673 | A1 | 7/2018 | Jain et al. |
| 2018/0219770 | A1 | 8/2018 | Wu et al. |
| 2018/0219777 | A1 | 8/2018 | He et al. |
| 2018/0285288 | A1 | 10/2018 | Bernat et al. |
| 2018/0287864 | A1 | 10/2018 | Hockett et al. |
| 2018/0287938 | A1 | 10/2018 | Han |
| 2018/0368060 | A1 | 12/2018 | Kedalagudde et al. |
| 2018/0373553 | A1 | 12/2018 | Connor et al. |
| 2019/0018785 | A1 | 1/2019 | Beard et al. |
| 2019/0102213 | A1 | 4/2019 | Yousaf et al. |
| 2019/0132211 | A1 | 5/2019 | Yeung et al. |
| 2019/0319896 | A1 | 10/2019 | Guo et al. |
| 2019/0363985 | A1 | 11/2019 | He et al. |
| 2019/0370050 | A1 | 12/2019 | Kumar et al. |
| 2020/0065208 | A1 | 2/2020 | Vijendra et al. |
| 2020/0204486 | A1 | 6/2020 | Wu et al. |
| 2021/0263857 | A1 | 8/2021 | Roberts et al. |
| 2022/0210062 | A1 | 6/2022 | Brar et al. |

FOREIGN PATENT DOCUMENTS

| | | |
|---|---|---|
| CN | 103391232 | 11/2013 |
| CN | 104094229 | 10/2014 |
| CN | 104094230 | 10/2014 |
| CN | 104685507 | 6/2015 |
| CN | 105262668 | 1/2016 |
| RU | 2645595 | 2/2018 |
| WO | 2005093560 | 10/2005 |
| WO | 2009055556 | 4/2009 |
| WO | 2015061731 | 4/2015 |
| WO | 2019079960 | 5/2019 |

OTHER PUBLICATIONS

Final Office Action from U.S. Appl. No. 18/078,382 notified Aug. 19, 2024, 22 pgs.
Final Office Action from U.S. Appl. No. 18/078,382 notified Nov. 15, 2023, 21 pgs.
Final Office Action from U.S. Appl. No. 18/081,358 notified Jan. 29, 2024, 9 pgs.
Non-Final Office Action from U.S. Appl. No. 18/078,382 notified Feb. 14, 2024, 24 pgs.
Non-Final Office Action from U.S. Appl. No. 18/081,358 notified Oct. 17, 2023, 26 pgs.
Notice of Allowance from Chinese Patent Application No. 201780095188.4 notified May 17, 2024, 7 pgs.
Office Action from Chinese Patent Application No. 201780095188.4 notified Dec. 29, 2023, 11 pgs.
Extended European Search Report for European Patent Application No. 17929786.6, dated Apr. 29, 2021.
Extended European Search Report from European Patent Application No. 19183505.7 notified Nov. 27, 2019, 8 pgs.
Extended European Search Report from European Patent Application No. 23167719.6 notified Jul. 5, 2023, 13 pgs.
Final Office Action from U.S. Appl. No. 16/131,012 notified May 10, 2022, 16 pgs.
International Search Report and Written Opinion for PCT Patent Application No. PCT/CN2017/107442, dated Jul. 25, 2018.
Non-Final Office Action from U.S. Appl. No. 16/131,012 notified Nov. 12, 2021, 16 pgs.
Non-Final Office Action from U.S. Appl. No. 18/078,382 notified May 10, 2023, 19 pgs.
Notice of Allowance for U.S. Appl. No. 15/716,890, dated May 25, 2022.
Notice of Allowance from EP Patent Application No. 19183 505.7 notified Sep. 27, 2021, 7 pgs.
Notice of Allowance from European Patent Application No. 17929786.6 notified Mar. 28, 2023, 8 pgs.
Notice of Allowance from U.S. Appl. No. 16/131,012 notified Aug. 31, 2022, 6 pgs.
Notice of Allowance from U.S. Appl. No. 16/643,626 notified Apr. 24, 2023, 21 pgs.
Notice of Allowance from U.S. Appl. No. 17/945,455 notified Jul. 18, 2023, 8 pgs.
Office Action for U.S. Appl. No. 15/716,890, dated Jun. 10, 2021.
Office Action for U.S. Appl. No. 15/716,890, dated Nov. 27, 2020.
Office Action for U.S. Appl. No. 16/643,626, dated Aug. 9, 2022.
Office Action for U.S. Appl. No. 16/643,626, dated Dec. 7, 2022.
Office Action for U.S. Appl. No. 16/643,626, dated Mar. 2, 2022.
""Office Action for U.S. Appl. No. 17/945,455, dated Jan. 20, 2023.
"Architecting a VMware vCloud NFV OpenStack Edition NFV Platform", Reference Architecture, Version 2.0, 2017.
"Endpoint Operations Management Agent Plug-in Development Kit", VMware, Inc., vRealize Operations Manager 6.5, 2018, 81 pgs.
"Network Functions Virtualisation (NFV); Acceleration Technologies; IFA 001: Overview & Use Cases;", ETSI GS IFA 001 V0.6.0, Jul. 2015, 50pgs.
"Network Functions Virtualisation; Part 1: Infrastructure Architecture; Sub-part 4: Architecture of the Hypervisor Domain", GS NFV INF .03 V0.0.2, Jan. 2013, 34 pgs.
"Reference Architecture", VMware, Inc., vRealize Operations Manager 6.7, Jul. 19, 2018, 29 pgs.
"VMware Offers Communications Service Providers the Fastest Path to OpenStack for Network Functions Virtualization", News Releases, Sep. 12, 2017; retrieved online via https://news.vmware.com/releases/vmware-offers-communications-service-providers-the-fastest-path-to-openstack-for-network-functions-virtualization on Sep. 14, 2022.
"VMware vCloud NFV The name of the base system (platform)", https://tadviser.com/index.php/Product:VMware_vCloud_NFV, Aug. 17, 2022.
"VRealize Operations Definitions for Metrics, Properties, and Alerts", VMware, Inc., vRealize Operations Manager 6.7, Feb. 22, 2019, 215 pgs.
"VRealize Operations Manager 6.7 Help", VMware, Inc., vRealize Operations Manager 6.7, Feb. 22, 2019, 973 pgs.
"VRealize Operations Manager 6.7 Release Notes", Apr. 2, 2019, 12 pgs.
"VRealize Operations Manager API Programming Guide", VMware, Inc., vRealize Operations Manager 6.7, 2018, 30 pgs.
"VRealize Operations Manager Best Practices", Supplemental Guide Version 6.x, Apr. 2018, 20 pgs.
"VRealize Operations Manager Configuration Guide", VMware, Inc., vRealize Operations Manager 6.7, Feb. 22, 2019, 302 pgs.
"VRealize Operations Manager Load Balancing", Configuration guide 6.x, Technical White Paper, Apr. 2018, Version 1.6, 47 pgs.
"VRealize Operations Manager OPS-CLI Help", VMware, Inc., vRealize Operations Manager 6.7, Jul. 19, 2018, 9 pgs.
"VRealize Operations Manager User Guide", VMware, Inc., vRealize Operations Manager 6.7, Jul. 19, 2018, 74 pgs.
"VRealize Operations Manager vApp Deployment Guide", VMware, Inc., vRealize Operations Manager 6.7, Feb. 22, 2019, 53 pgs.
"VRealize Suite 2017 Backup and Restore", VMware, Inc., 2017, 63 pgs.
Pfefferele, J., et al., "A Hybrid I/O Virtualization Framework for RDMA-capable Network Interfaces", VEE '15, ACM Sigplan Notices, ACM, Mar. 14-15, 2015, pp. 17-30.
Tang, H., et al., "IOMMU Para-Virtualization for Efficient and Secure DMA in Virtual Machines", KSII Transactions on Internet and Information Systems, vol. 10, No. 12, Dec. 31, 2016, pp. 5938-5963.

* cited by examiner

INTERWORKING OF LEGACY APPLIANCES IN VIRTUALIZED NETWORKS

CLAIM OF PRIORITY

This application is a continuation of prior co-pending U.S. patent application Ser. No. 17/945,455, filed Sep. 15, 2022 and titled "INTERWORKING OF LEGACY APPLIANCES IN VIRTUALIZED NETWORKS," which is a continuation of prior U.S. patent application Ser. No. 15/716,890, filed Sep. 27, 2017 and titled "INTERWORKING OF LEGACY APPLIANCES IN VIRTUALIZED NETWORKS" (now U.S. Pat. No. 11,469,953). Each of the aforesaid prior Patent Applications is hereby incorporated herein by reference in its entirety.

FIELD OF THE SPECIFICATION

This disclosure relates in general to the field of network services, and more particularly, though not exclusively, to a system and method for interworking of legacy appliances in virtualized networks.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
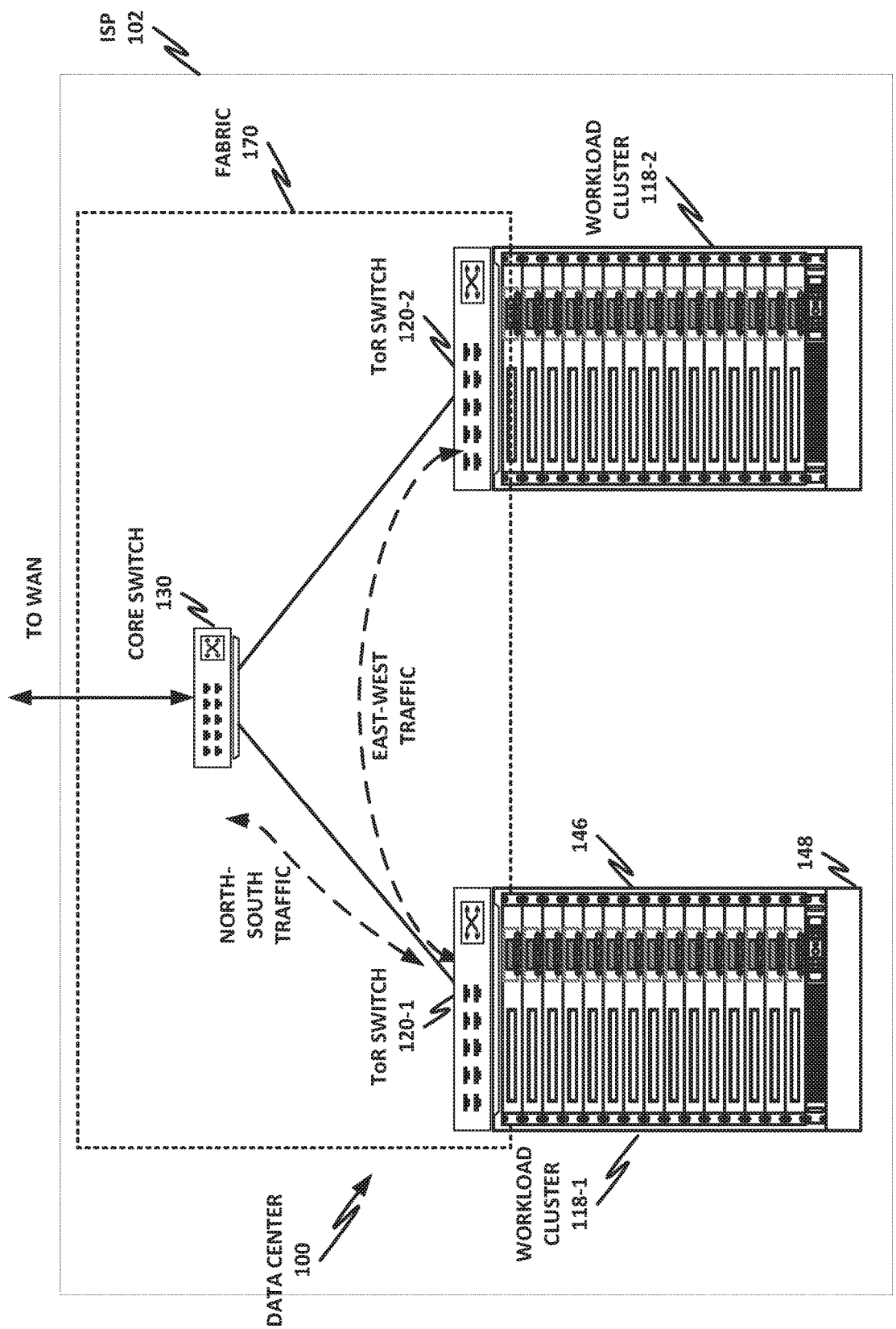
FIG. 1 is a block diagram of selected components of a data center with network connectivity, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Migration and upgrading of data centers, such as those operated by Internet service providers (ISPs), or other service providers such as cloud service providers (CSPs), software as a service, infrastructure as a service, enterprise networks, or other types of networks is commonly an incremental or gradual process. Existing network functions may be maintained so long as they continue to meet enterprise needs. Because many enterprises have invested large capital expenditures into their computing resources, it is not fiscally practical to overhaul and/or completely replace a data center or other enterprise network all at once.

This can lead to a situation where networks can exist in a heterogeneous form. For example, an enterprise may have invested capital expenditures on legacy hardware switches and hardware appliances such as firewalls, routers, e-mail scanners, spam filtering appliances, or other physical appliances. As used throughout this specification, an "appliance" may refer to any discrete or virtual network device, which may be configured to provide one or more network services.

In a legacy network, these appliances may have been connected in a physical service chain, with interconnection provided, for example, by a physical switch. Each appliance may have included a configuration interface, such as a command-line interface accessible via a secure shell terminal, or a web-based graphical user interface (GUI) that formats commands in a format such as extensible markup language (XML) or JavaScript object notation (JSON).

As the needs of the enterprise evolve, certain elements of the existing legacy infrastructure may be migrated or replaced. A contemporary trend is to use software defined networking (SDN) with network function virtualization (NFV), and to provide virtualized appliances that can be remotely managed by a management and orchestration (MANO) stack via a single unified interface. Thus, rather than a network administrator manually administering a large number of physical legacy appliances via a command-line argument (CLA), an administrator may use a MANO interface to graphically allocate and manage a large number of enterprise resources with much less individual effort.

However, as noted above, the migration of an enterprise may be a gradual process. This can lead to a situation where the enterprise, such as an ISP, may have server racks or sleds providing dynamically allocated compute resources for NFV, while other network functions are still provided by legacy appliances, such as hardware appliances.

In such a heterogeneous environment, it is advantageous to provide a mechanism for the system administrator to manage both the modern virtualized functions as well as the legacy or hardware-based network functions via a single interface. Thus, the enterprise can maximize its capital expenditures on legacy products, while conveniently providing a method for the network administrator to administer and treat those legacy devices as though they were in many respects contemporary virtual network functions (VNFs).

The present specification describes a system and method for integrating legacy network appliances lacking native interoperability with an orchestrator into NFV and/or SDN infrastructures without modifying the legacy systems, including the legacy management and telemetry systems. This allows the NFV and/or SDN to be aware of the configuration of the legacy appliances and the legacy telemetry, thus enabling NFV to support the legacy systems and manage them as though they were NFV appliances. In some embodiments, legacy network functions can be managed as though they were in every respect NFVs, except in the ability to dynamically create or terminate instances of the appliance, as those instances exist in hardware.

This enables an enterprise with a large capital investment in legacy appliances to seamlessly roll out NFV and SDN while maintaining integration with those legacy systems. Advantageously, this can be done with lower overhead than is achieved with other systems that rely on bridging techniques.

By way of example, the MANO may include a virtual infrastructure manager (VIM), such as OpenStack or similar. An interworking broker function (IBF) may be provided to seamlessly integrate legacy network functions with the MANO configuration tools. The IBF may be a process that runs natively on bare metal, within the VIM, or as a virtual machine or container in its own right according to the needs of the various embodiments.

In an example, the IBF scans the network for legacy devices or appliances using standard IP discovery methods to identify which legacy devices exist on the network. The IBF can then query those legacy devices via a known protocol, which advantageously can be an existing and standardized protocol such as simple network management protocol (SNMP). SNMP provides an ability to "walk" a treelike structure for discovering available servers and network functions. Using the SNMP query, the IBF can discover the management information database (MIB) type for each existing legacy network function.

The IBF may then associate the legacy device with an IBF instance, and build a specific interworking broker function that translates MANO commands into appropriate commands for the legacy device. Once the legacy device is associated with an IBF instance with an appropriate translation driver (TD) for that legacy device, then the IBF can report to the MANO the availability of the legacy network device, and may indicate available behavior using, for example, an extended network service descriptor (NSD).

The IBF may be further configured to query a legacy network appliance for capability information or a messaging format and build the TD based on the capability information or messaging format. The TD, which is specific to the legacy device, or to the class of legacy device, may enable the MANO to operate, manage, and orchestrate the legacy devices as though they were VNFs.

A system and method for interworking of legacy appliances in virtualized networks will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of an Internet service provider (ISP) 102, according to one or more examples of the present specification. ISP 102 may be, by way of nonlimiting example, an enterprise network, a cloud service provider, or any other suitable network providing services such as infrastructure as a service (IaaS), platform as a service (PaaS), or software as a service (SaaS).

ISP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
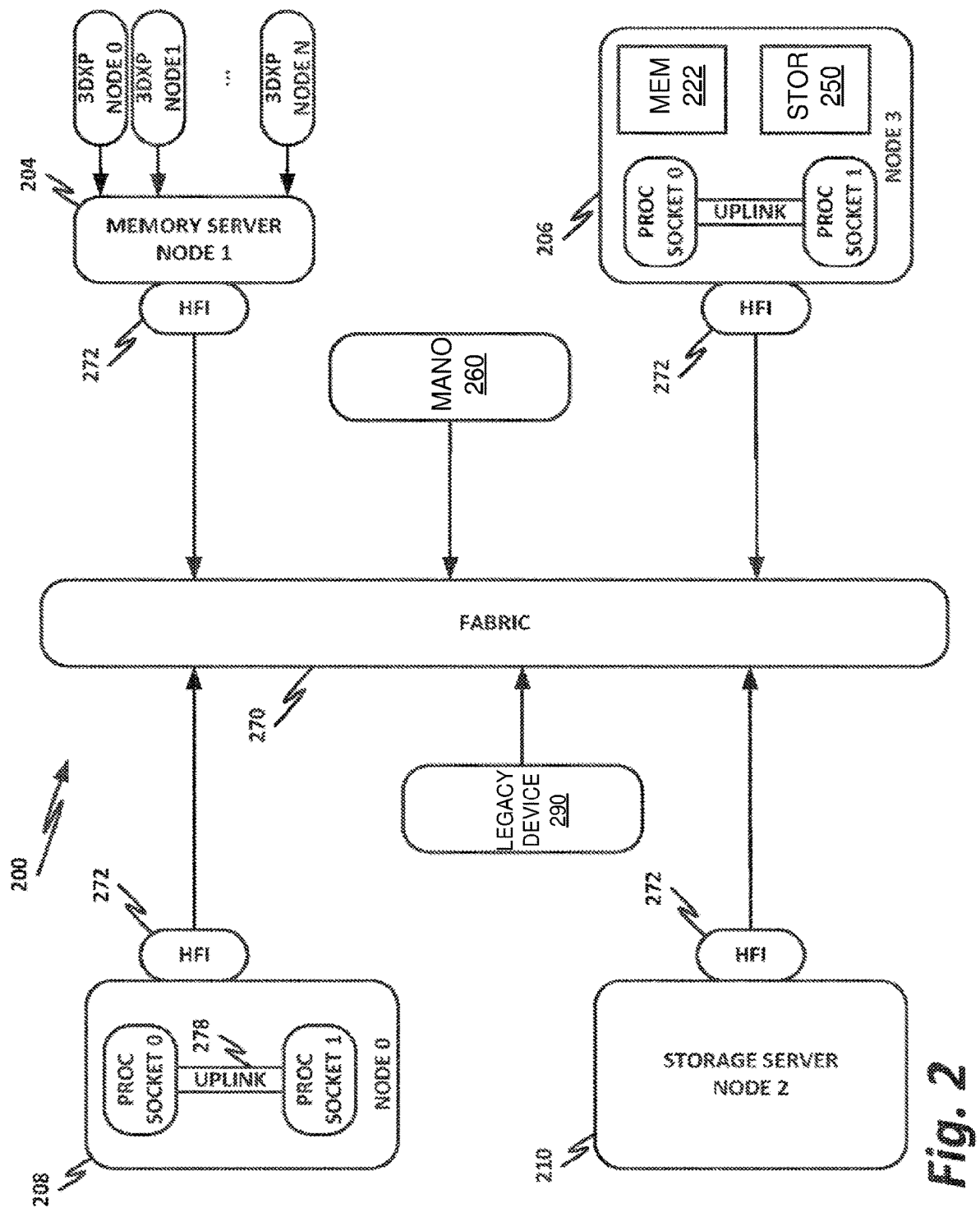
FIG. 2 is a block diagram of a heterogeneous network, according to one or more examples of the present specification.

FIG. 2 is a block diagram of a heterogeneous network 200 according to one or more examples of the present specification. Heterogeneous network 200 may be, in various embodiments, the same as network 100 of FIG. 1, or may be a different data center. Additional views are provided in FIG. 2 to illustrate different aspects of heterogeneous network 200.

In this example, a fabric 270 is provided to interconnect various aspects of heterogeneous network 200, including MANO 260 and one or more legacy devices 290. Legacy devices 290 may be, for example, physical appliances or single-purpose hardware appliances, legacy network functions, legacy virtual machines, or other network functions that do not have a native capability to interoperate with MANO 260.

Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, heterogeneous network 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because heterogeneous network 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout heterogeneous network 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory.

The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes an HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
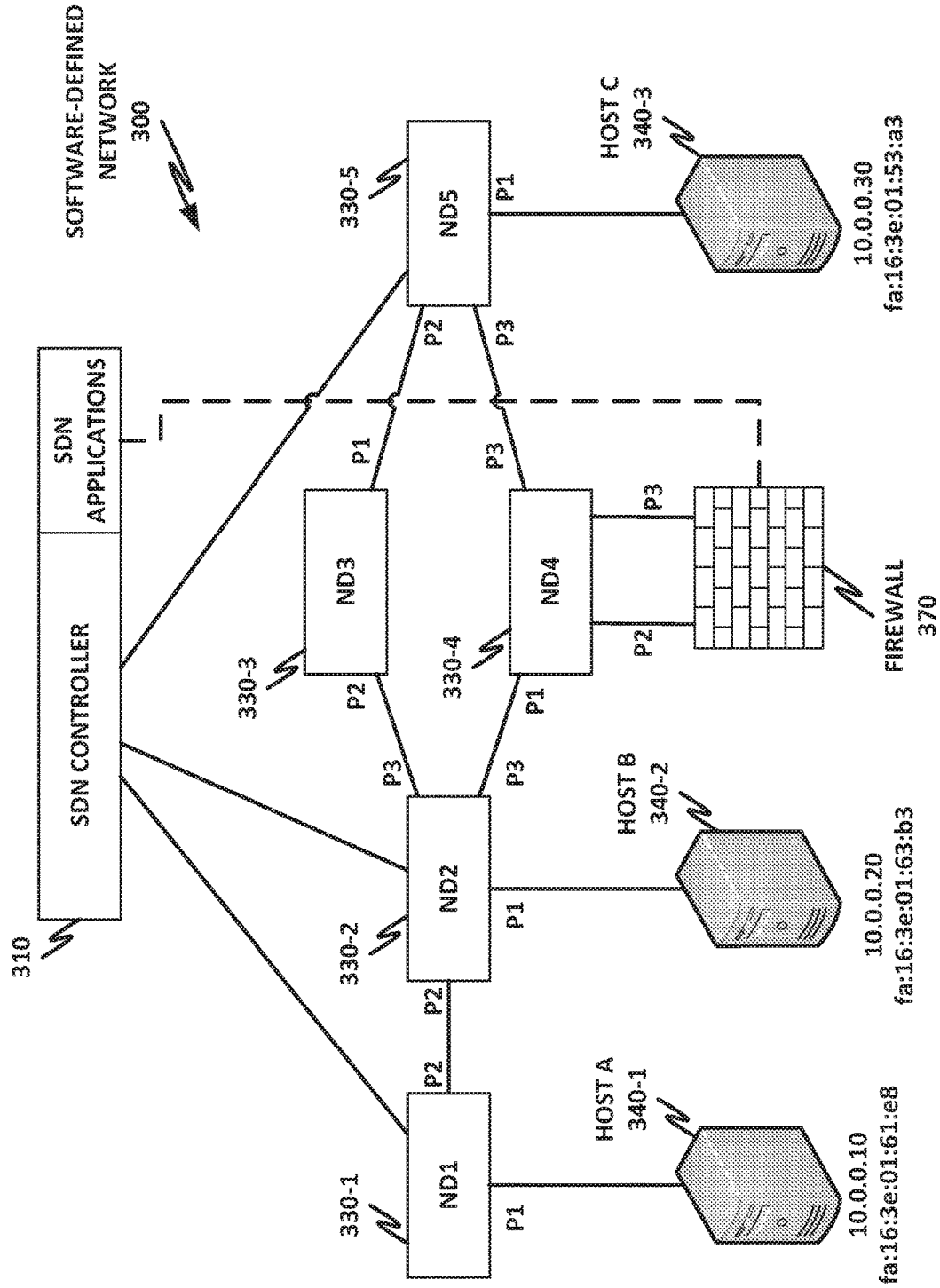
FIG. 3 is a block diagram of a software-defined network, according to one or more examples of the present specification.

FIG. 3 is a block diagram of a software-defined network 300, according to one or more examples of the present specification. In software defined networking (SDN), a data plane is separated from a control plane to realize certain advantages. SDN is only one flavor of virtualization, shown here to illustrate one option for a network setup.

SDN 300 is controlled by an SDN controller 310. SDN controller 310 is communicatively coupled to a plurality of network devices 330. Specifically, ND1 330-1, ND2 330-2, and ND5 330-5 are directly communicatively coupled to SDN controller 310. Network devices ND3 330-3 and ND4 330-4 are not directly coupled to SDN controller 310, but rather coupled via the intermediate devices, such as ND2 330-2, and ND5 330-5.

Some network devices 330 also communicatively couple directly to host devices 340. Specifically, network device ND1 directly couples to host A 340-1, which has IP address 10.0.0.10, and MAC address FA:16:3:01:61:8. Network device ND2 330-2 directly couples to host B 340-2, which has IP address 10.0.0.20, and MAC address FA:16:3:01:63:B3. Network device ND5 330-5 directly couples to host D 440-3, which has IP address 10.0.0.30, and MAC address FA:16:3:01:54:83.

Network devices 330 may be configured to perform a variety of network functions, such as, by way of nonliming example, load-balancing, firewall, deep packet inspection (DPI), DNS, antivirus, or any other suitable network function. The particular arrangement of interconnections between network devices 330 and from network devices 330 to host devices 340 may be determined by the particular network configuration and needs. Thus, the specific configuration of FIG. 3 should be understood to be an illustrative example only.

Each network device 330 may have a plurality of ingress and/or egress interfaces, such as physical Ethernet or fabric ports. In an example, each interface may have a label or new name, such as P1, P2, P3, P4, P5, and so on.

Thus, certain aspects of the network layout can be determined by inspecting which devices are connected on which interface. For example, network device ND1 330-1 has an ingress interface for receiving instructions and communicating with SDN controller 310. ND1 330-1 also has an interface P1 communicatively coupled to host A 340-1. ND1 330-1 has interface P2 that is communicatively coupled to ND2 330-2. In the case of ND2 330-2, it also couples to ND1 330-1 on its own interface P2, and couples to host B 340-2 via interface P1. ND2 330-2 communicatively couples to intermediate devices ND3 330-3 and ND4 330-4 via interfaces P3 and P4 respectively. Additional interface definitions are visible throughout the figure.

A flow table may be defined for traffic as it flows from one interface to another. This flow table is used so that a network device, such as ND2 330-2 can determine, after receiving a packet, where to send it next.

For example, the following flow tables may be defined for ND1 330-1 -ND4 330-4.

TABLE 1

ND1 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P2 |

TABLE 2

ND2 Flow Rule

| Ingress I/F | Source MAC | Destination Mac | Source IP | Dest. IP | Action |
|---|---|---|---|---|---|
| P2 | ANY | fa:16:3e:01:54:a3 | ANY | 10.0.0.30 | P4 |

TABLE 3

ND3 Flow Rule

| Ingress I/F | Source MAC | Destination Mac | Source IP | Dest. IP | Action |
|---|---|---|---|---|---|
| P1 | ANY | fa:16:3e:01:54:a3 | ANY | 10.0.0.30 | P3 |

TABLE 4

ND4 Flow Rule

| Ingress I/F | Source MAC | Destination Mac | Source IP | Dest. IP | Action |
|---|---|---|---|---|---|
| P3 | ANY | fa:16:3e:01:54:a3 | ANY | 10.0.0.30 | P1 |

Figure 4:
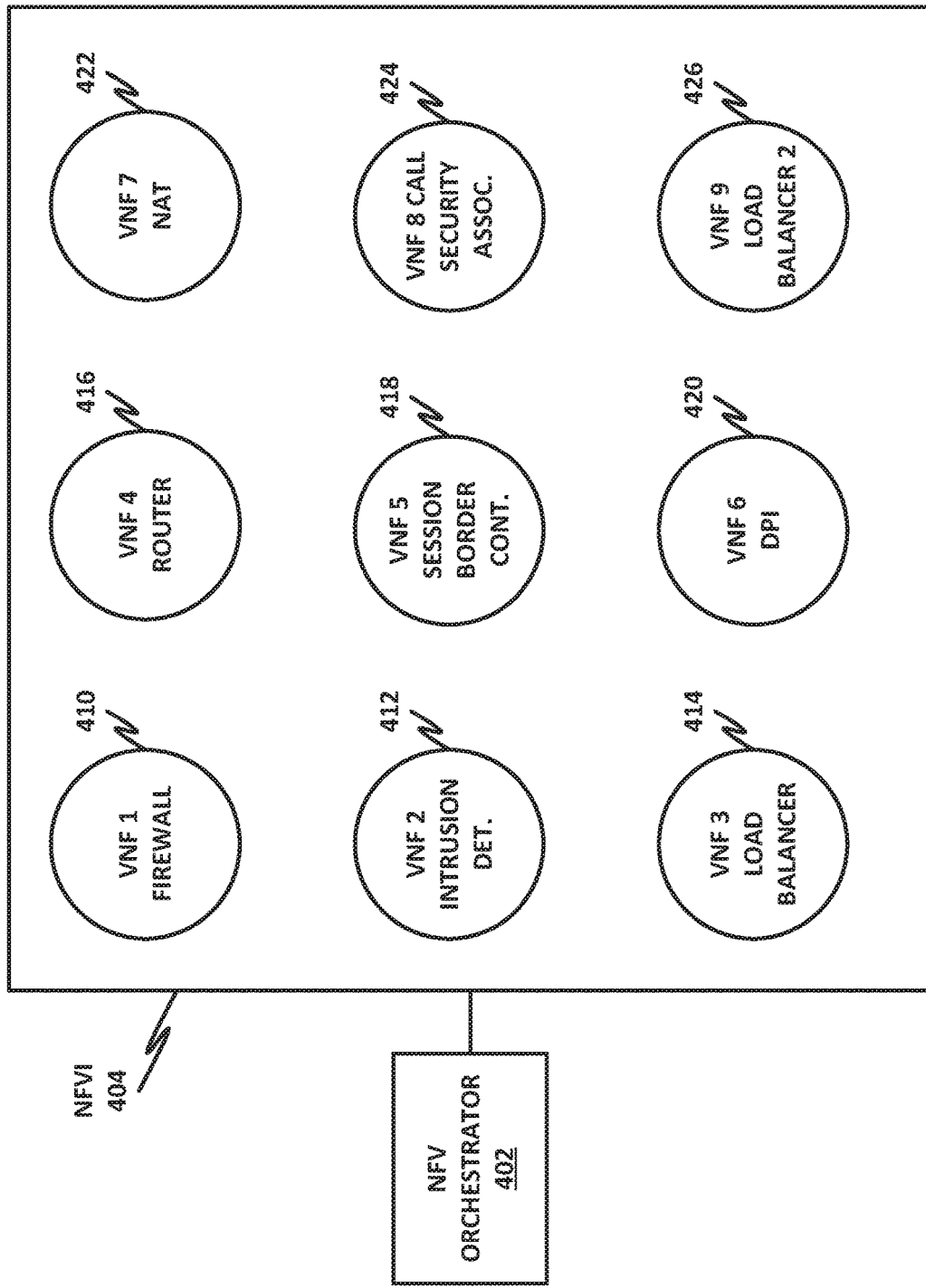
FIG. 4 is a block diagram illustrating a network function virtualization (NFV) architecture, according to one or more examples of the present specification.

FIG. 4 is a block diagram illustrating a network function virtualization (NFV) architecture according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

The illustrations of this in FIGS. 3 and 4 may be considered more functional, compared to more high-level, logical network layouts. Like SDN, NFV is a subset of network virtualization. Thus, the network as illustrated in FIG. 4 may be defined instead of or in addition to the network of FIG. 3. In other words, certain portions of the network may rely on SDN, while other portions (or the same portions) may rely on NFV.

In the example of FIG. 4, an NFV orchestrator 402 manages a number of the VNFs running on an NFVI 404. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 402.

Note that NFV orchestrator 402 itself is usually virtualized (rather than a special-purpose hardware appliance). NFV orchestrator 402 may be integrated within an existing SDN system, wherein an operations support system (OSS) manages the SDN. This may interact with cloud resource management systems (e.g., OpenStack) to provide NFV orchestration. An NFVI 404 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 404 may also include the software architecture that enables hypervisors to run and be managed by NFV orchestrator 402. Running on NFVI 404 are a number of virtual machines, each of which in this example is a VNF providing a virtual service appliance. These include, as nonlimiting and illustrative examples, VNF 1 410, which is a firewall, VNF 2 412, which is an intrusion detection system, VNF 3 414, which is a load balancer, VNF 4 416, which is a router, VNF 5 418, which is a session border controller, VNF 6 420, which is a deep packet inspection (DPI) service, VNF 7 422, which is a network address translation (NAT) module, VNF 8 424, which provides call security association, and VNF 9 426, which is a second load balancer spun up to meet increased demand.

Firewall 410 is a security appliance that monitors and controls the traffic (both incoming and outgoing), based on matching traffic to a list of "firewall rules." Firewall 410 may be a barrier between a relatively trusted (e.g., internal) network, and a relatively untrusted network (e.g., the Internet). Once traffic has passed inspection by firewall 410, it may be forwarded to other parts of the network.

Intrusion detection 412 monitors the network for malicious activity or policy violations. Incidents may be reported to a security administrator, or collected and analyzed by a security information and event management (SIEM) system. In some cases, intrusion detection 412 may also include antivirus or antimalware scanners.

Load balancers 414 and 426 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 416 forwards packets between networks or subnetworks. For example, router 416 may include one or more ingress interfaces, and a plurality of egress interfaces, with each egress interface being associated with a resource, subnetwork, virtual private network, or other division. When traffic comes in on an ingress interface, router 416 determines what destination it should go to, and routes the packet to the appropriate egress interface.

Session border controller 418 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 420 provides deep packet inspection, including examining not only the header, but also the content of a packet to search for potentially unwanted content (PUC), such as protocol non-compliance, malware, viruses, spam, or intrusions.

NAT module 422 provides network address translation services to remap one IP address space into another (e.g., mapping addresses within a private subnetwork onto the larger internet).

Call security association 424 creates a security association for a call or other session (see session border controller 418 above). Maintaining this security association may be critical, as the call may be dropped if the security association is broken.

The illustration of FIG. 4 shows that a number of VNFs have been provisioned and exist within NFVI 404. This figure does not necessarily illustrate any relationship between the VNFs and the larger network.

Figure 5:
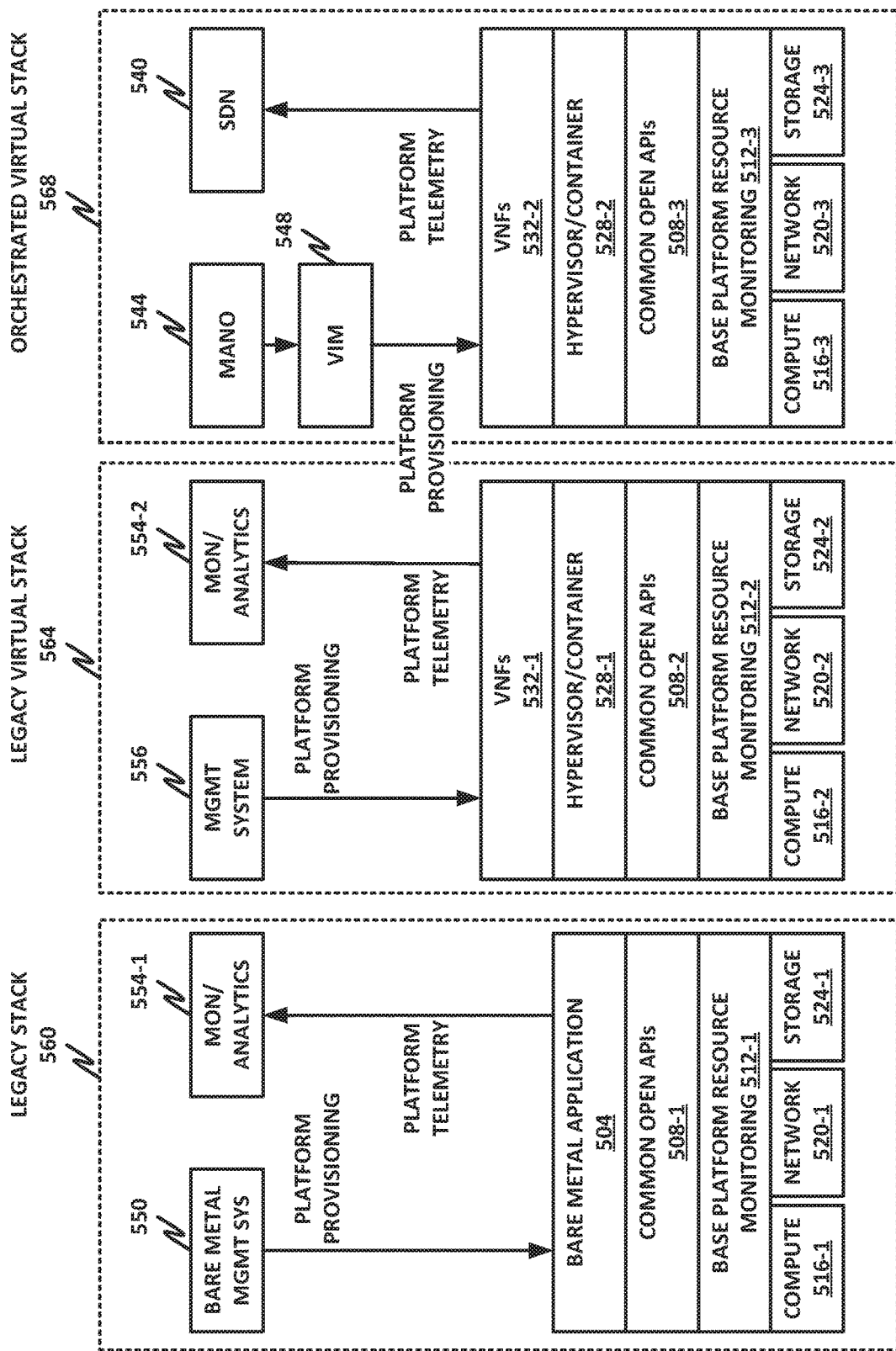
FIG. 5 is a block diagram of a data center including both virtualized computing resources and legacy appliances, according to one or more examples of the present specification.

FIG. 5 is a block diagram of a heterogeneous data center 500 according to one or more examples of the present specification. In this example, heterogeneous data center network 500 includes a legacy stack 560, a legacy virtual network 564, and an orchestrated virtual network 568.

In this example, legacy stack 560 includes a bare metal application 504 which may be running on a dedicated hardware appliance, such as a firewall, switch, router, or other common physical appliance. Bare metal application 504 may include a dedicated hardware platform that is operated solely for bare metal application 504. The hardware platform may include compute resources 516-1, network resources 520-1, and storage resources 524-1 by way of nonlimiting example. These resources may provide base platform resource monitoring 512-1, which may interact with a monitoring and analytics function 554-1, which provides monitoring and analytics for bare metal application 504. There may also be provided a bare metal management system 550, which may include, for example, a command-line interface (CLI) accessible via an application such as telnet or secure shell (SSH) or a web-based graphical management system, which may translate configuration rules or instructions into a standards-compliant format such as XML or simple network management protocol (SNMP) instructions, and may be used to configure the behavior of bare metal application 504. Bare metal management system 550 provides platform provisioning, while monitoring and analytics function 554-1 receives platform telemetry. A set of common open application program interfaces (APIs) 508-1 may be provided to facilitate such management. For example, the common open APIs may include SNMP, which is a standards-compliant method for managing network appliances.

Absent an interworking broker function as described in this specification, a network administrator may need to administer legacy stack 560 separately via bare metal management system 550. As the size of the network grows, and as more appliances are added, this can become an added burden to network management that can be obviated by the use of an interworking broker function.

Similarly, legacy virtual stack 564 includes a plurality of virtual network functions 532-1 running from a hypervisor or a container 528-1 on a hardware platform including, for example, compute resources 516-2, network resources 520-2, and storage resources 524-2

Similar to legacy stack 560, platform provisioning includes a management system 556 which may be used for platform provisioning of VNFs 532-1. As before, these may be managed via a set of common open APIs 580-2, which may be the same or similar to common open APIs 508-1 of legacy stack 560. These could also be different common open APIs. Legacy virtual stack 564 includes base platform resource monitoring 512-2, which provides platform telemetry to monitoring and analytics function 554-2.

In this example, similar to legacy stack 560, legacy virtual stack 564 includes a management system 556 that may not be natively compatible with MANO 544. Thus, absent an interworking broker function, legacy virtual stack 564 may need to be managed separately from legacy stack 560 and orchestrated virtual network 568. This can also be an added burden for the network administrator.

Heterogeneous data center 500 also includes an orchestrated virtual network 568, which includes a MANO function 544, which interoperates with a virtual infrastructure manager (VIM) 548, such as OpenStack or similar.

The VIM 548 launches multiple instances of VNFs 532-2 to provide functions within heterogeneous network 500. These may be contained within a hypervisor and/or container 528-2. As with legacy virtual stack 564, orchestrated virtual stack 568 includes a hardware platform including compute resources 516-3, network resources 520-3, and storage resources 524-3. Base platform resource monitoring 512-3 may provide platform telemetry to SDN 540. And as before, common open APIs 508-3 may be used by VIM 548 to provide platform provisioning.

As discussed above, it is advantageous to provide an interworking broker function so that MANO 544 can configure and manage both legacy virtual stack 564 and legacy stack 560.

Figure 6:
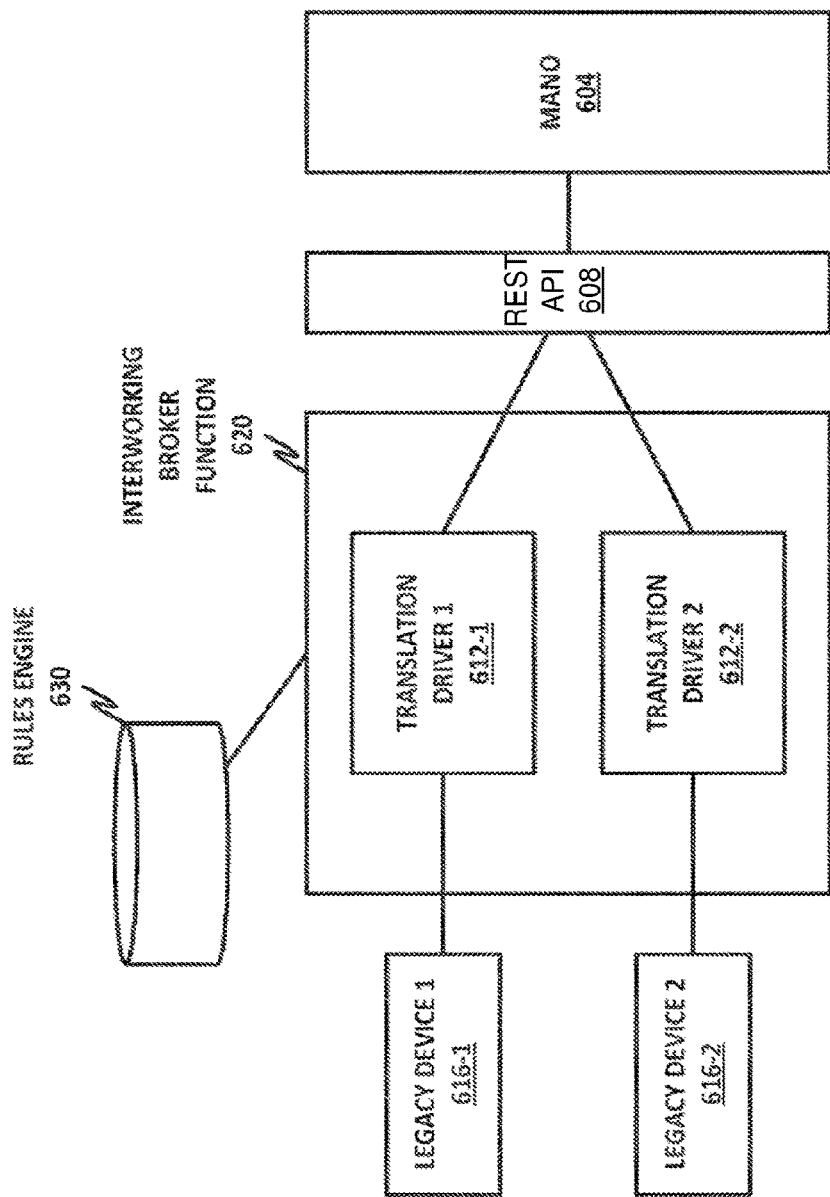
FIG. 6 is a block diagram illustrating communication between an orchestrator and legacy devices, according to one or more examples of the present specification.

FIG. 6 is a block diagram of an interworking broker function according to one or more examples of the present specification.

Note that in this example, interworking broker function 620 may be any appropriate hardware or software implementation as provided for in the present specification. Interworking broker function 620 may include appropriate hardware, software, firmware, instructions stored on a tangible, non-transitory computer readable medium, an application-specific integrated circuit or field-programmable gate array, a native application running directly on a domain controller or on the same hardware platform as MANO 544 of FIG. 5, one or more virtual machines, or any other combination of hardware or software as appropriate to an implementation.

In this example, a single interworking broker function 620 is illustrated as providing two translation drivers, namely translation driver 1 612-1 and translation driver 2 612-2. Note that this is a nonlimiting example, and can scale in many different ways depending on the needs of a particular deployment. For example, translation driver 1 612-1 and translation driver 2 612-2 may each be for a different specific legacy device or appliance such as legacy device 1 616-1 and legacy device 2 616-2. In this example, only two legacy devices 616 are shown, with each one being serviced by a single instance of a translation driver 612. However, other configurations are possible. For example, there could be many instances of legacy device 2 616-2, in which case all instances of that legacy device may be served by a single translation driver 2 612-2. In other embodiments, a plurality of translation drivers 2 612-2 may be provided to service the plurality of instances of legacy device 2 616-2. In general terms, an interworking broker function 620 may host one or more translation drivers 612 of one or more different species, and translation drivers 612 of a particular species may be deployed on one or more devices or virtual machines hosting one or more instances of an interworking broker function 620.

In this example, interworking broker function 620 may initially discover legacy devices 616 by performing a standard SNMP network query. SNMP provides an ability to walk a treelike structure, and discover the various functions that may be provided on the network. Once interworking broker function 620 has discovered all instances of legacy devices 616, it may build appropriate translation drivers 612 for each legacy device. This can be based on, for example, a rules engine 630, which may include a rules database for providing translations for various types of legacy devices. This can include mappings of MANO commands to legacy devices, and mappings of platform telemetry back to a format consumable by MANO 604. Once IBF 620 has notified MANO 604 of the available legacy devices 616, MANO 604 may then proceed to manage those devices as though they were natively orchestrated virtual machines or containers. MANO 604 may communicate with IBF 620 via an appropriate API such as a rest API 608.

Translation drivers 612 of IBF 620 may provide various translations including, by way of nonlimiting example, mapping VIM requests to legacy SNMP, network configuration protocol (NETCONF), CLIs, XML, or other formats to interwork with VIMs such as OpenStack. In certain embodiments, an NFV-to-legacy mapping may automatically map VIM instructions to requests for SNMP or CLI. For example, IBF 620 may map an enhanced platform awareness (EPA) capability request message from a MANO request to, by way of nonlimiting example, an SNMP request, CLI request, and/or other legacy interface. In the opposite direction, translation driver 612 may map SNMP traps to the message queuing telemetry transport (MQTT) bus for a ceilometer or watcher. It may also map syslog telemetry, netflows, or sflow telemetry to a ceilometer or sub-network access protocol (SNAP) by way of nonlimiting example.

Extensions may also be made to MANO 604, or to a VIM such as VIM 548 of FIG. 5. For example, the network service descriptor (NSD) may be extended to represent legacy appliances. In some examples, the association process that associates a legacy appliance with the IBF and a particular translation driver may itself be a VNF. In any case, at least the IP address of a legacy device may be linked to an appropriate IBF instance 620 and/or translation driver 612.

In some embodiments, a mobile embedded computer (MEC) module may be used on two independent networks (for example, a legacy network and a managed network), giving MANO the ability to scan legacy network appliances such as for IP addresses or wide area network (WAN) connections, and then avoid reusing that space.

In various embodiments, IBF 620 may operationally work as an interworking function or in some embodiments as a telemetry bridge from the legacy stack to the managed stack. Additionally, the IBF may be configured to receive from the orchestrator a network function provisioning or configuration command for a legacy network appliance.

The IBF may further be configured to receive a message from the legacy network appliance, and within the TD translate the message into a format consumable by the orchestrator. The message may be, by way of nonlimiting example, an IP packet, an ATM or frame relay message, a simple object access protocol (SOAP) message, a NETCONF message, an XML or JSON message, or a CLI command. Further nonlimiting examples of a message include alert, event, or telemetry messages. An alert or event may be, by way of nonlimiting example, an SNMP trap, an SNMP format message, or an Internet protocol flow information export (IPFIX).

Figure 7:
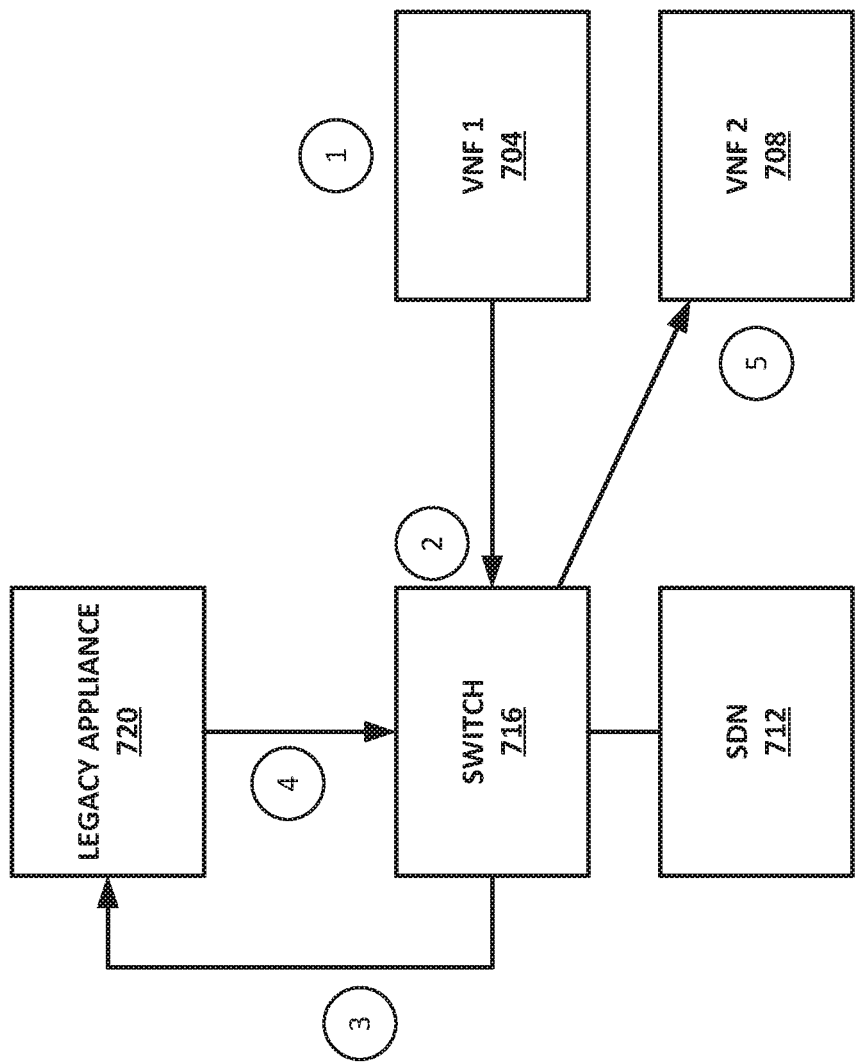
FIG. 7 is a block diagram illustrating a service chain including both virtualized functions and a legacy appliance, according to one or more examples of the present specification.

FIG. 7 is a block diagram of a service chain illustrating how a legacy appliance 720 can be integrated seamlessly into a service chain that may include managed virtual appliances.

In this example, legacy appliance 720 may be, for example, a hardware appliance, while VNF 1 704 and VNF 2 708 are managed virtual appliances. A switch 716, which may be, for example, a legacy hardware switch, may also operate within the network. An SDN controller 712 provides SDN services to the network.

Because legacy appliance 720 includes physical ingress and egress ports, it may not integrate virtually and seamlessly with a virtual service chain, which provides forwarding tables on a virtual switch. Rather, switch 716 may provide appropriate forwarding rules to enable legacy appliance 720 to be part of an appropriate service chain. In this example, the service chain may go from VNF 1 704 to legacy appliance 720 to VNF 2 708, and finally to a destination device.

To provide this service chain, at 1, traffic arrives on an ingress virtual interface of VNF 1 704. VNF 1 704 performs its function on the packet, and then forwards the packet via a virtual egress interface to switch 716. At 2, switch 716 receives the packet on an ingress interface connected to VNF 1 704, then switches the packet out to legacy appliance 720. Switch 716 may be configured with appropriate forwarding rules to ensure that traffic on the ingress interface from VNF 1 704 is switched to legacy appliance 720.

At 3, switch 716 switches the packet out to legacy appliance 720 according to its forwarding rules.

At 4, legacy appliance 720 performs its function on the packet, and returns the packet to switch 716.

Switch 716 receives the packet on an ingress interface connected to legacy appliance 720, and according to its forwarding rules, switches the packet out finally to VNF 2 708. VNF 2 708 is the last function in the service chain, and at 5, VNF 2 708 performs its function on the packet. Finally, VNF 2 708 delivers the packet to the destination device.

Figure 8:
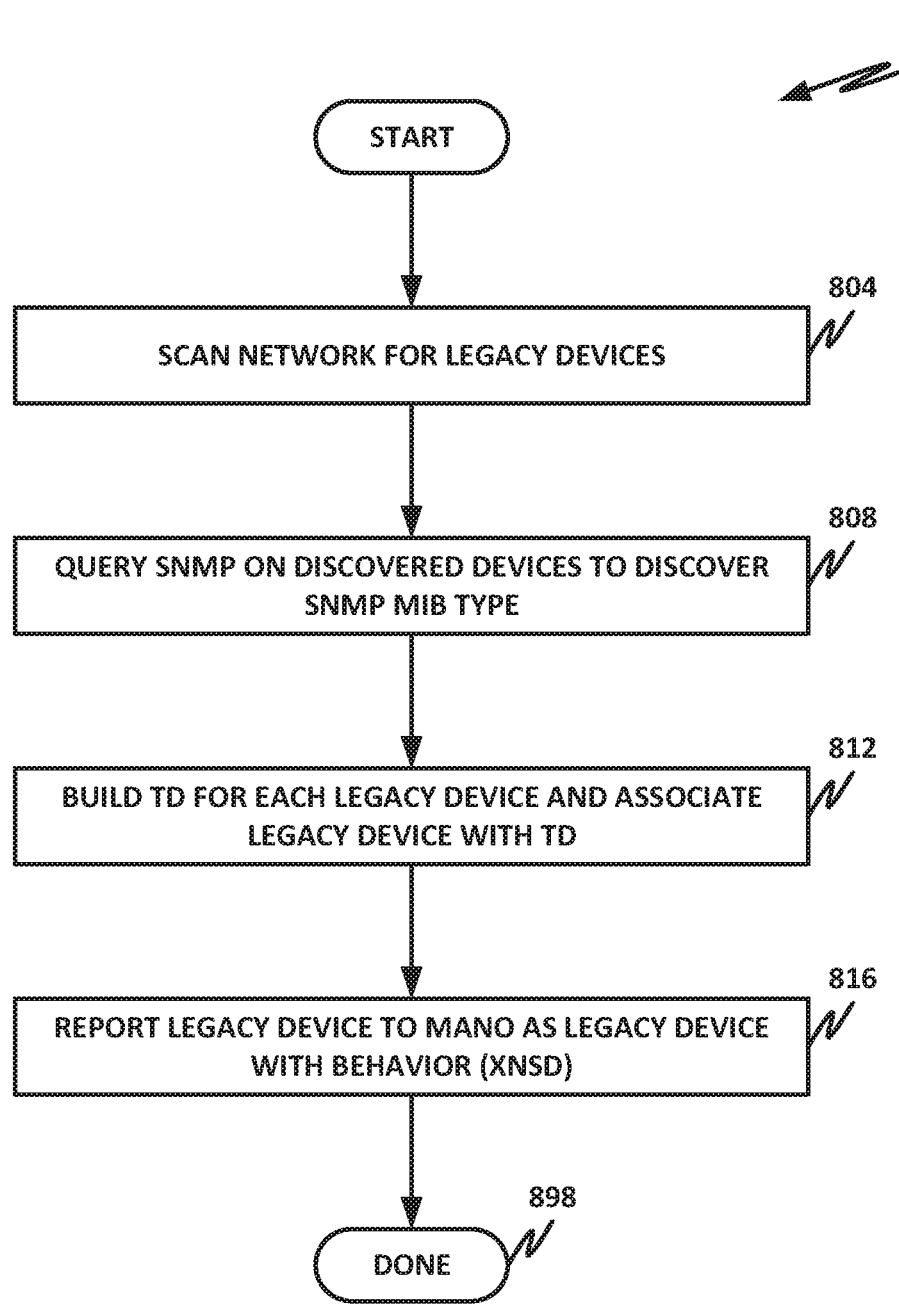
FIG. 8 is a flowchart of a method of legacy appliance discovering in an orchestrated network according to one or more examples of the present specification.

FIG. 8 is a flowchart of a method 800 of performing discovery on a heterogeneous network according to one or more examples of the present specification.

Method 800 may be performed in various embodiments by any appropriate device, including an IBF by way of nonlimiting example. An IBF will be used in the description of FIG. 8 as an example of a function that could perform the method. However, any appropriate device engine or function could be used to perform method 800.

In block 804, IBF scans the network for legacy devices. This may include using standard IP discovery methods to determine which devices exist on the network. In some examples, this may also include SNMP queries.

In block 808, once available legacy devices on the network have been scanned and discovered, the IBF may provide an SNMP or similar query on all the devices that it discovers, for example, to discover the SNMP MIB type. The MIB type may inform the IBF of available formats for providing communication with the legacy devices.

In block 812, the IBF builds a translation driver for each legacy device. This may include extracting or finding an MIB and using the MIB to build the appropriate translations between the legacy format and the managed VNF format. The IBF then associates the translation driver with the legacy device.

Once the appropriate translation drivers have been built and associated with the legacy device, the IBF reports the legacy devices to the MANO as legacy devices. This may include reporting the behaviors and capabilities of the legacy devices, such as via an extended network service descriptor (NSD).

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator).

In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform; and an interworking broker function (IBF) hosted on the hardware platform, the IBF comprising a translation driver (TD) associated with a legacy network appliance lacking native interoperability with an orchestrator, the IBF configured to: receive from the orchestrator a network function provisioning or configuration command for the legacy network appliance; operate the TD to translate the command to a format consumable by the legacy network appliance; and forward the command to the legacy network appliance.

Example 2 includes the computing apparatus of example 1, wherein the orchestrator is a management and orchestration (MANO)-compliant orchestrator Example 3 includes the computing apparatus of example 1, wherein the IBF is further configured to receive a message from the legacy network appliance, and within the TD translate the message into a format consumable by the orchestrator.

Example 4 includes the computing apparatus of example 3, wherein the message is an IP packet.

Example 5 includes the computing apparatus of example 3, wherein the message is an asynchronous transfer mode (ATM) or frame relay message.

Example 6 includes the computing apparatus of example 3, wherein the message is an alert, event, or telemetry message.

Example 7 includes the computing apparatus of example 6, wherein the alert or event comprises a simple network management protocol (SNMP) trap.

Example 8 includes the computing apparatus of example 6, wherein the alert or event comprises an IPFIX.

Example 9 includes the computing apparatus of example 3, wherein the message is an SNMP format message.

Example 10 includes the computing apparatus of example 3, wherein the message is a simple object access protocol (SOAP), XML, or JSON message.

Example 11 includes the computing apparatus of example 3, wherein the message is a NETCONF message.

Example 12 includes the computing apparatus of example 3, wherein the message is a command line interface (CLI) command.

Example 13 includes the computing apparatus of any of examples 1-12, wherein the IBF is further configured to: scan the network for the legacy network appliance; query the legacy network appliance for capability information or a messaging format; and build the TD based on the capability information or messaging format.

Example 14 includes the computing apparatus of example 12, wherein the capability or messaging format comprises MIB information.

Example 15 includes the computing apparatus of example 12, wherein the IBF is further configured to associate the legacy network appliance with the TD.

Example 16 includes the computing apparatus of example 12, wherein the IBF is further configured to notify the orchestrator of the legacy network appliance.

Example 17 includes one or more tangible, non-transitory computer-readable mediums having stored thereon instructions for providing an interworking broker function (IBF) comprising a translation driver (TD), the IBF configured to: associate the TD with a legacy network appliance lacking native interoperability with an orchestrator; receive from the orchestrator a network function provisioning or configuration command for the legacy network appliance; operate the TD to translate the command to a format consumable by the legacy network appliance; and forward the command to the legacy network appliance.

Example 18 includes the one or more tangible, non-transitory computer-readable mediums of example 17, wherein the orchestrator is a management and orchestration (MANO)-compliant orchestrator.

Example 19 includes the one or more tangible, non-transitory computer-readable mediums of example 17, wherein the IBF is further configured to receive a message from the legacy network appliance, and within the TD translate the message into a format consumable by the orchestrator.

Example 20 includes the one or more tangible, non-transitory computer-readable mediums of example 19, wherein the message is an IP packet.

Example 21 includes the one or more tangible, non-transitory computer-readable mediums of example 19, wherein the message is an asynchronous transfer mode (ATM) or frame relay message.

Example 22 includes the one or more tangible, non-transitory computer-readable mediums of example 19, wherein the message is an alert, event, or telemetry message.

Example 23 includes the one or more tangible, non-transitory computer-readable mediums of example 22, wherein the alert or event comprises a simple network management protocol (SNMP) trap.

Example 24 includes the one or more tangible, non-transitory computer-readable mediums of example 19, wherein the alert or event comprises an IPFIX.

Example 25 includes the one or more tangible, non-transitory computer-readable mediums of example 19, wherein the message is an SNMP format message.

Example 26 includes the one or more tangible, non-transitory computer-readable mediums of example 19, wherein the message is a SOAP, XML, or JSON message.

Example 27 includes the one or more tangible, non-transitory computer-readable mediums of example 19, wherein the message is a NETCONF message.

Example 28 includes the one or more tangible, non-transitory computer-readable mediums of example 19, wherein the message is a command line interface (CLI) command.

Example 29 includes the one or more tangible, non-transitory computer-readable mediums of any of examples 17-28, wherein the IBF is further configured to: scan the network for the legacy network appliance; query the legacy network appliance for capability information or a messaging format; and build the TD based on the capability information or messaging format.

Example 30 includes the one or more tangible, non-transitory computer-readable mediums of example 29, wherein the capability or messaging format comprises MIB information.

Example 31 includes the one or more tangible, non-transitory computer-readable mediums of example 29, wherein the IBF is further configured to associate the legacy network appliance with the TD.

Example 32 includes the one or more tangible, non-transitory computer-readable mediums of example 29, wherein the IBF is further configured to notify he orchestrator of the legacy network appliance.

Example 33 includes a computer-implemented method of providing an interworking broker function (IBF) comprising a translation driver (TD), comprising: associating the TD with a legacy network appliance lacking native interoperability with an orchestrator; receiving from the orchestrator a network function provisioning or configuration command for the legacy network appliance; operating the TD to translate the command to a format consumable by the legacy network appliance; and forwarding the command to the legacy network appliance.

Example 34 includes the method of example 33, wherein the orchestrator is a management and orchestration (MANO)-compliant orchestrator.

Example 35 includes the method of example 33, further comprising receiving a message from the legacy network appliance, and within the TD translating the message into a format consumable by the orchestrator.

Example 36 includes the method of example 35, wherein the message is an IP packet.

Example 37 includes the method of example 35, wherein the message is an asynchronous transfer mode (ATM) or frame relay message.

Example 38 includes the method of example 35, wherein the message is an alert, event, or telemetry message.

Example 39 includes the method of example 38, wherein the alert or event comprises a simple network management protocol (SNMP) trap.

Example 40 includes the method of example 38, wherein the alert or event comprises an IPFIX.

Example 41 includes the method of example 35, wherein the message is an SNMP format message.

Example 42 includes the method of example 35, wherein the message is a SOAP, XML, or JSON message.

Example 43 includes the method of example 35, wherein the message is a NETCONF message.

Example 44 includes the method of example 35, wherein the message is a command line interface (CLI) command.

Example 45 includes the method of example 33, further comprising: scanning the network for the legacy network appliance; querying the legacy network appliance for capability information or a messaging format; and building the TD based on the capability information or messaging format.

Example 46 includes the method of example 45, wherein the capability or messaging format comprises MIB information.

Example 47 includes the method of example 45, wherein the IBF is further configured to notify the orchestrator of the legacy network appliance.

Example 48 includes an apparatus comprising means for performing the method of any of examples 33-47.

Example 49 includes the apparatus of example 48, wherein the means for performing the method comprise a processor and a memory.

Example 50 includes the apparatus of example 49, wherein the memory comprises machine-readable instructions, that when executed cause the apparatus to perform the method of any of examples 33-47.

Example 51 includes the apparatus of any of examples 48-50, wherein the apparatus is a computing system.

Example 52 includes at least one computer readable medium comprising instructions that, when executed, implement a method or realize an apparatus as illustrated in any of examples 33-51.

What is claimed is:

1. At least one non-transitory machine-readable memory storing instructions for being executed by at least one machine, the at least one machine to be associated with server system hardware, the server system hardware being for use in association with network functions, the network functions to be provided, at least in part, via network devices, the server system hardware to be associated with a management and orchestration (MANO) stack, the MANO stack to be associated with an Openstack-compatible virtual infrastructure manager (VIM), the instructions, when executed by the at least one machine, resulting in the server system hardware being configured to enable performance of operations comprising:
    obtaining simple network management protocol (SNMP) data associated with the network devices, the SNMP data being for use by at least one virtual machine (VM) instance in generating identifying information related to the network functions and/or the network devices; and
    obtaining command line interface request data associated with at least one of the network devices for use in generating the identifying information;
    wherein:
        the at least one VM instance is associated with the Openstack-compatible VIM and the MANO stack;
        the identifying information is for being provided to the MANO stack;
        the network functions are configurable to comprise at least one virtual network function of a telecommunications network function virtualization infrastructure; and
        the at least one virtual network function is configurable to implement, at least in part, a session border controller.

2. The at least one non-transitory machine-readable memory of claim 1, wherein:
    the identifying information is for use by the MANO stack and/or the VIM in one or more management-related operations associated with the network devices; and
    the network devices and/or the network functions are to be implemented via one or more virtual machines and/or one or more containers executed using physical computer hardware.

3. The at least one non-transitory machine-readable memory of claim 1, wherein:
    the instructions, when executed, also result in the server system hardware being configured to enable performance of dynamically creating and/or dynamically terminating at least one network function-related instance; and
    the at least one network function-related instance is associated with at least one stack that is associated with the VIM.

4. The at least one non-transitory machine-readable memory of claim 1, wherein:
    the session border controller is for use in association with voice over Internet Protocol (VOIP) communication.

5. A method implemented using server system hardware, the server system hardware being for use in association with network functions, the network functions to be provided, at least in part, via network devices, the server system hardware to be associated with a management and orchestration (MANO) stack, the MANO stack to be associated with an Openstack-compatible virtual infrastructure manager (VIM), the method comprising:
    obtaining simple network management protocol (SNMP) data associated with the network devices, the SNMP data being for use by at least one virtual machine (VM) instance in generating identifying information related to the network functions and/or the network devices; and
    obtaining command line interface request data associated with at least one of the network devices for use in generating the identifying information;
    wherein:
        the at least one VM instance is associated with the Openstack-compatible VIM and the MANO stack;
        the identifying information is for being provided to the MANO stack;
        the network functions are configurable to comprise at least one virtual network function of a telecommunications network function virtualization infrastructure; and
        the at least one virtual network function is configurable to implement, at least in part, a session border controller.

6. The method of claim 5, wherein:
    the identifying information is for use by the MANO stack and/or the VIM in one or more management-related operations associated with the network devices; and
    the network devices and/or the network functions are to be implemented via one or more virtual machines and/or one or more containers executed using physical computer hardware.

7. The method of claim 5, wherein:
    the method also comprises dynamically creating and/or dynamically terminating at least one network function-related instance; and
    the at least one network function-related instance is associated with at least one stack that is associated with the VIM.

8. The method of claim 5, wherein:
    the session border controller is for use in association with voice over Internet Protocol (VOIP) communication.

9. A server system hardware for use in association with network functions, the network functions to be provided, at least in part, via network devices, the server system hardware to be associated with a management and orchestration (MANO) stack, the MANO stack to be associated with an Openstack-compatible virtual infrastructure manager (VIM), the server system hardware comprising:
  at least one server node to obtain:
    simple network management protocol (SNMP) data associated with the network devices, the SNMP data being for use by at least one virtual machine (VM) instance in generating identifying information related to the network functions and/or the network devices; and
    command line interface request data associated with at least one of the network devices for use in generating the identifying information;
  wherein:
    the at least one VM instance is associated with the Openstack-compatible VIM and the MANO stack;
    the identifying information is for being provided to the MANO stack;
    the network functions are configurable to comprise at least one virtual network function of a telecommunications network function virtualization infrastructure; and
    the at least one virtual network function is configurable to implement, at least in part, a session border controller.

10. The server system hardware of claim 9, wherein:
the identifying information is for use by the MANO stack and/or the VIM in one or more management-related operations associated with the network devices; and
the network devices and/or the network functions are to be implemented via one or more virtual machines and/or one or more containers executed using physical computer hardware.

11. The server system hardware of claim 9, wherein:
the server system hardware is configured to dynamically create and/or dynamically terminate at least one network function-related instance; and
the at least one network function-related instance is associated with at least one stack that is associated with the VIM.

12. The server system hardware of claim 9, wherein:
the session border controller is for use in association with voice over Internet Protocol (VOIP) communication.

13. A multi-server system for use in providing of at least one cloud service, the multi-server system comprising:
  at least one server comprising hardware to obtain:
    simple network management protocol (SNMP) data associated with the network devices, the SNMP data being for use by at least one virtual machine (VM) instance in generating identifying information related to the network functions and/or the network devices; and
    command line interface request data associated with at least one of the network devices for use in generating the identifying information; and
  at least one other server comprising other hardware to dynamically create and/or dynamically terminate at least one network function-related instance;
  wherein:
    the at least one VM instance is associated with the Openstack-compatible VIM and/or the MANO stack;
    the identifying information is for being provided to the MANO stack;
    the network functions are configurable to comprise at least one virtual network function of a telecommunications network function virtualization infrastructure; and
    the at least one virtual network function is configurable to implement, at least in part, a session border controller.

14. The multi-server system of claim 13, wherein:
the identifying information is for use by the MANO stack and/or the VIM in one or more management-related operations associated with the network devices; and
the network devices and/or the network functions are to be implemented via one or more virtual machines and/or one or more containers executed using physical computer hardware.

15. The multi-server system of claim 13, wherein:
the at least one network function-related instance is associated with at least one stack that is associated with the VIM.

16. The multi-server system of claim 13, wherein:
the session border controller is for use in association with voice over Internet Protocol (VOIP) communication.

* * * * *